United States Patent

Takizawa et al.

[11] Patent Number: 6,165,549
[45] Date of Patent: Dec. 26, 2000

[54] PROCESS FOR PRODUCING SOLVENT-FREE ACRYLIC SHEET

[75] Inventors: Youichi Takizawa; Ryuuji Sakashita; Susumu Kawase, all of Tokyo, Japan

[73] Assignee: Soken Chemical & Engineering Co., Ltd., Japan

[21] Appl. No.: 09/307,680

[22] Filed: May 10, 1999

[30] Foreign Application Priority Data

May 11, 1998 [JP] Japan .................................. 10-127453

[51] Int. Cl.$^7$ ....................................................... B05D 5/10
[52] U.S. Cl. ...................................... 427/208.4; 427/379
[58] Field of Search .................................. 427/208.4, 379

[56] References Cited

FOREIGN PATENT DOCUMENTS

| | | |
|---|---|---|
| 50-102635 | 8/1975 | Japan . |
| 58-087171 | 5/1983 | Japan . |
| 05005014 | 1/1993 | Japan . |
| 8-073827 | 3/1996 | Japan . |
| 11049811 | 2/1999 | Japan . |
| WO9529770 | 11/1995 | WIPO . |

*Primary Examiner*—Erma Cameron
*Attorney, Agent, or Firm*—Webb Ziesenheim Logsdon Orkin & Hanson, P.C.

[57] ABSTRACT

A process for producing a solvent-free acrylic sheet includes a coating step which may involve either coating at least one support with a solvent-free syrupy composition for coating polymerization or applying the solvent-free coating polymerization syrupy composition between at least two supports at a coating thickness of at least 0.15 mm to form a laminate. The solvent-free coating polymerization syrupy composition includes an acrylic vinyl monomer capable of radical polymerization.

The process further includes a heating polymerization step in which the laminate is heated at 60° C. or higher for reaction initiation so that autoexotherm is induced to cause the acrylic vinyl monomer to polymerize.

The process concludes with an aging polymerization step in which the laminate having undergone the heating polymerization step is maintained at a temperature that is at least 30° C. but lower than the heating temperature of the heating polymerization step so that a polymerization reaction is effected until the content of residual monomer in the laminate is 2% by weight or less based on the solvent-free coating polymerization syrupy composition to produce a thick acrylic sheet.

10 Claims, 5 Drawing Sheets

Fig. 5 ic sheet, more particularly a solvent-
PROCESS FOR PRODUCING SOLVENT-FREE ACRYLIC SHEET

FIELD OF THE INVENTION

The present invention relates to a process for producing a solvent-free, thick acrylic sheet, more particularly a solvent-free, thick acrylic adhesive sheet.

BACKGROUND OF THE INVENTION

An acrylic sheet such as a pressure sensitive adhesive sheet is commonly produced by a process comprising dispersing an acrylic polymer component in a solvent or dispersing an acrylic polymer component in a dispersion medium, coating a substrate with the solution or dispersion and removing the solvent or dispersion medium from the coating layer.

The solvent or dispersion medium used in the above process is removed after the coating. Therefore, not only is a relatively high cost required for the use, removal and recovery of the solvent or dispersion medium but also there is the danger of working environment pollution depending on the type of solvent or dispersion medium.

In these circumstances, there have been proposed processes in which, without the use of any solvent or dispersion medium, a monomer is applied onto a substrate and polymerized on the substrate.

For example, Japanese Patent Laid-open Publication No. 50(1975)-102635 discloses a pressure sensitive adhesive tape in which a mixture of an acrylic monomer and a thermal polymerization initiator is interposed in the form of a thin layer between a tape support and a release sheet and heated and polymerized in a closed system so that a semisolid pressure sensitive adhesive layer is formed therefrom.

When an acrylic monomer of low viscosity is applied in the form of a thin layer and thermally polymerized employing thus the technique disclosed in the above publication, because of the thinness of the layer, not only is the calorific value of polymerization small but also the heat of polymerization is effectively dissipated due to heat radiating from the surface of the tape support. As a result, the tape temperature is rarely higher than the temperature achieved when the reaction is initiated. That is, the monomer reaction temperature on the support is usually lower than the heating temperature for inducing the reaction. In the above application of the monomer onto the support in the form of a thin layer, the value of dissipated heat is generally greater than the calorific value of the polymerization reaction, so that the tape shrinkage and deformation by exotherm seldom occurs. Moreover, the reaction can be performed while controlling so as to avoid the support deformation, etc., thereby enabling the effective reduction in the amount of residual monomer.

On the other hand, apart from the above thin sheet, the sheet with a thick adhesive layer is advantageous, for example, because the stress at bonding can be absorbed to thereby enable maintaining a large bonding strength for a prolonged period of time and hence ensuring an enhanced bonding reliability in addition, when bonded to an adherend with an uneven surface, the thick adhesive layer sheet exhibits a high capability of following the uneven surface.

It is difficult to form this thick adhesive layer by the application of a monomer having a low viscosity. Even if a monomer is thickly applied, the calorific value generated by polymerization reaction is greater than the value of the heat spontaneously dissipated from the support because of the large thickness of the layer to thereby render the control of reaction temperature difficult.

The above reactive adhesive layer or the like is often applied onto a film of a synthetic resin such as a polyester resin as a support. Thus, when the reaction temperature is extremely high, the support is likely to suffer from thermal distortion or thermal shrinkage.

Therefore, in the formation of a layer whose thickness is greater than a given value, use is made of, for example, method (1) in which an acrylic adhesive dissolved or dispersed in a solvent is divided and applied a plurality of times, method (2) in which ultraviolet rays permitting a low temperature rise at reaction are irradiated to thereby effect polymerization, method (3) in which a screw extruder is employed and method (4) in which, for restricting the temperature rise during reaction, polymerization is performed while passing the reaction mixture through a heat buffer whose heat transfer coefficient is large (see Published Japanese Translation of PCT Patent Applications from Other States, No. 9(1997)-512054).

However, in the method (1), the coating thickness obtained by one coating operation is limited, so that it is required to pile thin-layer sheets one upon another, this resulting in a cost increase. Further, because of the use of a solvent, problems are encountered such that, when the molecular weight is large, the coating liquid has a high viscosity to thereby render the coating operation difficult and such that the use of a crosslinking agent is restricted. The method (2) is advantageous in that the use of ultraviolet rays enables the polymerization at room temperature to thereby enable controlling the heat of polymerization generated in the internal part of the sheet layers. However, the transmission of ultraviolet rays through the internal part of the sheet becomes difficult in accordance with the increase of the sheet thickness. Accordingly, the sheet surface at which the incident ray intensity is the maximum and the internal part or bottom part thereof have different polymerization rates with the result that it is difficult to produce a sheet of uniform thickness. In particular, when the sheet contains a filler through which ultraviolet rays cannot be transmitted, it is practically infeasible to employ this method. Further, for completing the polymerization, the period of ultraviolet irradiation must be prolonged to thereby increase both facility cost and production cost. Still further, although the technique of using an ultraviolet polymerization initiator and a thermal polymerization initiator in combination in order to treat residual monomers has been disclosed (see, for example, Japanese Patent Laid-open Publication No. 5(1993)-5014), this technique also invites facility cost and production cost increases. The method (3) comprises controlling the molecular weight of partial polymerizate by means of a screw extruder to thereby obtain a polymerizate whose conversion of monomers into a syrupy composition is about 90% and coating a sheet with the obtained polymerizate to thereby obtain a coated sheet. In this method, the fluidity must be ensured for conducting the polymerization reaction at high temperatures in a screw extruder. Thus, because the formation of a crosslinking structure in a polymerizate leads to an extreme viscosity increase, any crosslinking structure cannot be formed in the polymerizate in the screw extruder. Consequently, steps such as irradiating a material obtained by bulk polymerization with electron beams or sheeting a mixture of a polyfunctional monomer and a sheet forming material followed by irradiating the sheet with electron beams, radiation, ultraviolet rays or the like to thereby introduce a crosslinking structure are inevitable. The method (4) is advantageous in that the polymerization is performed in a heat buffer whose heat transfer coefficient is large while controlling the temperature of reaction mixture substantially within 20° C. to thereby enable imparting desirable properties to the adhesive sheet. However, there are problems such that it is difficult to complete the polymerization within a short period of time to thereby disenable the use of currently available heating oven drying equipment.

As apparent from the above, not only is the production of a thick sheet or thick adhesive sheet per se conspicuously difficult, but also a thick acrylic sheet or thick acrylic adhesive sheet having high uniformity and free of the distortion of support, etc. cannot be produced at a low cost using conventional processes.

The present invention provides a process for easily producing a thick sheet or thick adhesive sheet at low cost.

The present invention further provides a thick acrylic sheet or thick acrylic adhesive sheet having high uniformity and free of the distortion of support, and the like.

SUMMARY OF THE INVENTION

The process for producing a solvent-free acrylic sheet according to the present invention comprises:

a coating step comprising either coating at least one support with a solvent-free syrupy composition for coating polymerization or applying the solvent-free coating polymerization syrupy composition between at least two supports at a coating thickness of at least 0.15 mm to thereby form a laminate, the above solvent-free coating polymerization syrupy composition comprising an acrylic vinyl monomer capable of radical polymerization, at least one member selected from among an acrylic vinyl monomer containing partial polymerizate (a partial polymerizate of at least one acrylic vinyl monomer) and a polymer including a unit derived from an acrylic vinyl monomer, a low-temperature decomposable polymerization initiator having a 10 hr. half-life temperature ranging from 25° to 55° C. and a high-temperature decomposable polymerization initiator having a 10 hr half-life temperature ranging from above 55° to 90° C., the above solvent-free coating polymerization syrupy composition having a viscosity ranging from 20 to 2000 poises at 25° C., the above solvent-free coating polymerization syrupy composition containing substantially no solvent;

a heating polymerization step comprising heating the laminate at 60° C. or higher for reaction initiation so that autoexotherm is induced to thereby cause the acrylic vinyl monomer capable of radical polymerization contained in the solvent-free coating polymerization syrupy composition to polymerize until the content of residual monomer in the solvent-free coating polymerization syrupy composition is in the range of 2 to 20% by weight based on the total weight of the solvent-free coating polymerization syrupy composition; and an aging polymerization step comprising maintaining the laminate having undergone the heating polymerization step at a temperature that is at least 30° C. but lower than the heating temperature of the heating polymerization step so that a polymerization reaction is effected until the content of residual monomer in the laminate is 2% by weight or less based on the solvent-free coating polymerization syrupy composition.

The process of the present invention in which, as mentioned above, thermally decomposable initiators having different 10 hr. half-life temperatures are mixed with a product of partial polymerization of an acrylic monomer to thereby obtain a solvent-free coating liquid and this solvent-free coating liquid is subjected to a heating polymerization that utilizes an autoexotherm and thereafter an aging polymerization, enables the production of a 0.15 mm thick sheet without the occurrence of thermal distortion and with a high conversion of monomers into syrupy composition.

DETAILED DESCRIPTION OF THE INVENTION

Figure 5:
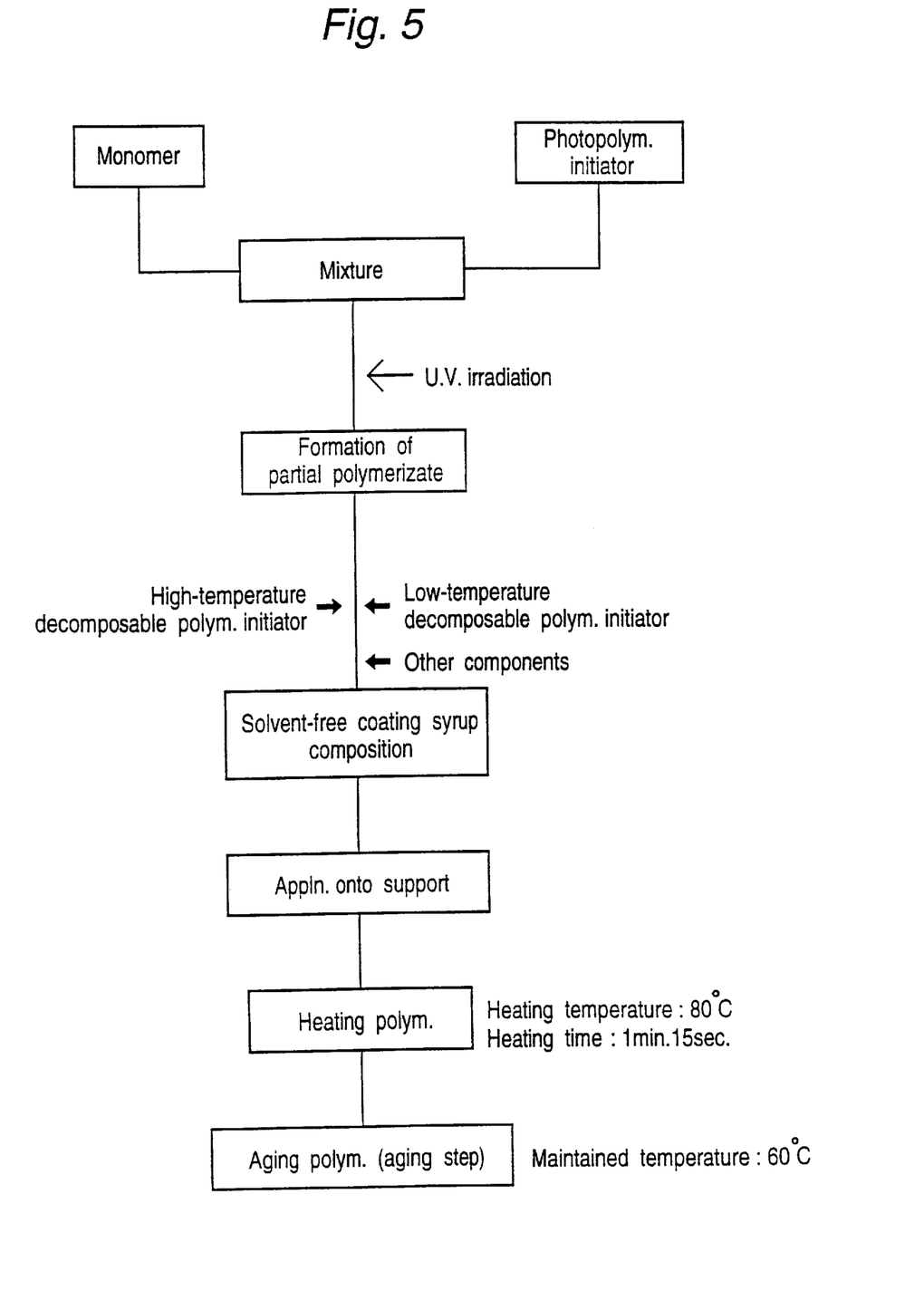
FIG. 5 is a chart schematically showing steps to be implemented in a mode of the process of the present invention.

The process for producing an acrylic sheet according to the present invention will be described in detail below with reference to FIG. 5.

In the process of the present invention, which departs from the conventional process in which a monomer per se is applied onto a support, use is made of a syrup obtained by dissolving a polymer in a monomer or partially polymerizing a monomer so that the monomer has a given viscosity.

This syrup can be prepared by, substantially without the use of any solvent, adding, for example, a photopolymerization initiator to a monomer and effecting a preliminary partial polymerization to a given polymerization degree of the monomer.

An acrylic vinyl monomer capable of radical polymerization is used as the monomer.

Examples of suitable acrylic vinyl monomers capable of radical polymerization include butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate, 2-ethylhexyl (meth)acrylate, isononyl (meth)acrylate, (meth)acrylic acid, itaconic acid, maleic acid, fumaric acid, 2-hydroxyethyl (meth)acrylate, methyl (meth)acrylate, ethyl (meth)acrylate, (meth)acrylamide, dimethylamide methacrylate, dimethylamide acrylate, stearyl (meth)acrylate, behenyl (meth)acrylate, methacrylate, isobutyl (meth)acrylate, isobornyl (meth)acrylate and dicyclopentyl (meth)acrylate. These acrylic monomers can be used in combination with other monomers such as vinyl acetate, styrene, divinylbenzene, ethylene, crotonic acid, vinyl propionate, α-methylstyrene, dicyclopentene and cumarone. The term of (meth)acryl- includes "methacryl-" and "acryl-" in the specification.

The above monomers can be used either individually or in combination.

A polymerization initiator is added to the above monomers in order to partially polymerize them. A thermally decomposable polymerization initiator and a photopolymerization initiator for initiating polymerization by irradiation with light such as ultraviolet rays or visible light can be used as the above polymerization initiator.

Examples of suitable thermally decomposable polymerization initiators include:

azo initiators such as 2,2'-azobisisobutyronitrile, 2,2'-azobis(2,4-dimethylvaleronitrile), 2,2'-azobiscyclohexylnitrile, 1,1'-azobis(cyclohexane-1-carbonitrile), 2-phenylazo-4-methoxy- 2,4-dimethylvaleronitrile, dimethyl 2,2'-azobisisobutyrate and 2,2'-azobis(2-metylbutyronitrile); and peroxide initiators such as benzoyl peroxide, 2,4-dichlorobenzoyl peroxide, 1-butyl peroxy-2-ehtylhexanoate, 1-butyl peroxy-3,5,5-trimethylhexanoate and tert-butyl peroxybenzoate.

Examples of suitable photoinitiators include acetophenones, benzoin ethers, ketones, thioxanthones, phosphine oxides, ketals and quinones.

Examples of the acetophenones include acetophenone, 2,2-diethoxyacetophenone, p-dimethylaminoacetophenone, p-dimethylaminopropiophenone, methoxyacetophenone, 2,2-dimethoxy-2-phenylacetophenone (trade name: Irgacure 651, produced by Ciba-Geigy), α-hydroxy-α,α'-dimethylacetophenone (trade name: Darocure 1173, produced by Ciba-Geigy), 2-hydroxy-2-cyclohexylacetophenone (trade name: Irgacure 184, produced by Ciba-Geigy) and 2-methyl-1-[4-(methylthio) phenyl]-2-morpholinopropanone-1 (trade name: Irgacure 907, produced by Ciba-Geigy).

Examples of the benzoin ethers include benzoin, benzoin methyl ether, benzoin ethyl ether, benzoin isopropyl ether and benzoin isobutyl ether.

Examples of the ketones include benzophenone, 2-chlorobenzophenone, p,p'-dichlorobenzophenone, p,p'-bisdiethylaminobenzophenone, N,N'-tetramethyl-4,41-diaminobenzophenone (Michler's ketone) and 4-(2-hydroxyethoxy)phenyl (2-hydroxy-2-propyl) ketone (trade name: Darocure 2659, produced by Ciba-Geigy).

Examples of the thioxanthones include thioxanthone, 2-chlorooxythioxanthone and 2-methylthioxanthone.

Examples of the phosphine oxides include bisacylphosphine oxide (BAPO) and benzoylphosphine oxide (TPO).

Examples of the ketals include benzyldimethylketal (trade name: Irgacure 651, produced by Ciba-Geigy).

Examples of the quinones include camphon-2,3-dione (camphorquinone) and phenanthrenequinone.

Of these polymerization initiators, photopolymerization initiators are preferred.

Appropriate amount of added polymerization initiator and appropriate reaction conditions are selected so that the obtained syrup has a viscosity at 25° C. ranging from 20 to 2000 poises, preferably 100 to 1000 poises.

The syrup with the above viscosity contains a partial polymerizate of the above acrylic monomer or a polymer including a unit derived from an acrylic vinyl monomer and unreacted acrylic monomer. The "partial polymerizate" may be partial homopolymerizate or partial copolymerizate of at least two monomers. Then, the "polymer" may be homopolymer or copolymer of at least two monomers. The weight average molecular weight of this syrup is generally in the range of 5 ten thousand to 150 ten thousand, preferably 10 ten thousand to 120 ten thousand.

For example, the production of the above viscosity containing syrup obtained by photopolymerization can be performed by effecting reaction substantially without the use of any reaction solvent in accordance with the method described in Japanese Patent Laid-Open Publication No. 11(1999)-49811.

In the present invention, two types of thermally decomposable polymerization initiators having different 10 hr half-life temperatures are added to the syrup having the above viscosity and the above weight average molecular weight.

A low-temperature decomposable polymerization initiator having a 10 hr half-life temperature ranging from 25° to 55° C. and a high-temperature decomposable polymerization initiator having a 10 hr half-life temperature ranging from above 55° to 90° C. are used in combination as the above polymerization initiators.

The low-temperature decomposable polymerization initiator for use in the present invention is, for example, selected from among isobutyl peroxide, ((α,α'-bisneodecanoylperoxy)diisopropylbenzene, cumyl peroxyneodecanoate, di-n-propyl peroxydicarbonate, diisopropyl peroxydicarbonate, 1,1,3,3-tetramethylbutyl peroxyneodecanoate, bis(4-t-butylcyclohexyl) peroxydicarbonate, 1-cyclohexyl-1-methylethyl peroxyneodecanoate, di-2-ethoxyethyl peroxydicarbonate, di(2-ethylethylperoxy) dicarbonate, t-hexyl peroxyneodecanoate, dimethoxybutyl peroxydicarbonate, di(3-methyl-3-methoxybutylperoxy) dicarbonate, t-butyl peroxyneodecanoate, 2,4-dichlorobenzoyl peroxide, 1-hexyl peroxypivalate and 1-butyl peroxypivalate.

On the other hand, the high-temperature decomposable polymerization initiator is, for example, selected from among 3,5,5-trimethylhexanoyl peroxide, octanoyl peroxide, lauroyl peroxide, stearoyl peroxide, 1,1,3,3-tetramethylbutyl peroxy-2-ethylhexanoate, succinperoxide, 2,5-dimethyl-2,5-di(2-ethylhexylperoxy)hexane, 1-cyclohexyl-1-methylethyl peroxy-2-ethylhexanoate, t-hexyl peroxy-2-ethylhexanoate, 1-butyl peroxy-2-oxy-2-ethylhexanoate, m-toluyl benzoyl peroxide, benzoyl peroxide, t-butyl peroxyisobutylate, 1,1-bis(t-hexylperoxy)-3,3,5-trimethylcyclohexane, 1,1-bis(t-hexylperoxy) cyclohexane and 1,1-bis(t-butylperoxy)-3,3,5-trimethylcyclohexane.

The above low-temperature decomposable polymerization initiator and high-temperature decomposable polymerization initiator are generally added in a weight ratio of 1:10 to 10:1, preferably 1:5 to 5:1, to the syrup. The addition of the low-temperature decomposable polymerization initiator and high-temperature decomposable polymerization initiator in the above weight ratio ensures the smooth advance of both polymerization reaction during the heating polymerization step (first polymerization step) and polymerization reaction during the aging polymerization step (second polymerization step).

The thus obtained solvent-free coating polymerization syrupy composition, per 100 parts by weight thereof, generally contains 0.05 to 5 parts by weight, preferably 0.1 to 2 parts by weight of the low-temperature decomposable polymerization initiator and further generally contains 0.05 to 5 parts by weight, preferably 0.1 to 2 parts by weight of the high-temperature decomposable polymerization initiator.

It is preferred that the low-temperature decomposable polymerization initiator and the high- temperature decomposable polymerization initiator are added in a total amount of 0.1 to 5 parts by weight per 100 parts by weight of the sum of the acrylic vinyl monomer capable of radical polymerization and the partial polymerizate of the acrylic vinyl monomer in the solvent-free coating polymerization syrupy composition.

In addition to the above components, a crosslinking agent, a molecular weight modifier, a filler, a powder, a tackifier resin and other common adhesive layer forming components can be added to the solvent-free coating polymerization syrupy composition.

For example, the crosslinking agent is selected from among divinylbenzene, diethyl glycol di(meth)acrylate, neopentyl glycol di(meth)acrylate, 1,6-hexanediol di(meth)acrylate, bisphenol A dioxydiethyl glycol di(meth)acrylate, trimethylolpropane tri(meth)acrylate, pentaerythritol tri (meth)acrylate and other polyfunctional monomers capable of radical polymerization. Furthermore, compounds which are reactive with functional groups contained in the solvent-free coating polymerization syrupy composition can be used as the crosslinking agent.

As these other crosslinking agents, there can be mentioned, for example, an epoxy compound, an isocyanate compound and an organometallic compound.

The powder for use in the present invention can be selected from among, for example, inorganic powders such as powders of silica, alumina, titanium oxide, silicon dioxide, silicon oxide, calcium carbonate, calcium silicate, magnesium carbonate, magnesium oxide, talc, kaolin clay, calcined clay, zinc oxide, zinc sulfate, aluminum hydroxide, aluminum oxide, glass mica, barium sulfate, alumina white and zeolite; resin particles produced from resins such as polymethyl (meth)acrylate, polystyrene, benzoguanamine resin, melamine resin, phenolic resin, silicone resin, urea resin, polyethylene resin, polyolefin resins, nylon resins, urethane resins, fluororesins, polyimide resins and epoxy resins; wax particles such as particles of polyethylene wax; and particles of natural materials such as corn starch. In addition to these solid particles, there can be mentioned hollow particles such as shirasu balloons, glass balloons, resin balloons and thermal expansion type polymer balloons. These can be employed either individually or in combination.

When the crosslinking agent is used, it is generally added in an amount of 0.01 to 3 parts by weight, preferably 0.03 to 1 part by weight, per 100 parts by weight of the syrup. The particles can generally be added in an amount of 0 to 80% by volume per 100 parts by weight of the syrup.

Moreover, the solvent-free coating polymerization syrupy composition can be loaded with a thermal stabilizer, an ultraviolet absorber, a mildewcide, a plasticizer, an unreactive oligomer, a pigment, a dye, a foam suppressant, a leveling agent, a coupling agent and other components which can generally be added to acrylic polymers.

The solvent-free coating polymerization syrupy composition is produced by mixing together the above syrup, high-temperature decomposable polymerization initiator, low-temperature decomposable polymerization initiator and other components such as a crosslinking agent and powder added according to necessity. These components are preferably mixed at such low temperatures that any polymerization reaction does not proceed during the mixing. Agitation is generally conducted at 20° C. or below, preferably 15° C. or below.

The viscosity at 25° C. of the thus prepared solvent-free coating polymerization syrupy composition is in the range of 20 to 2000 poises, preferably 100 to 1000 poises so that the coating can be performed at a satisfactory thickness. Despite having the above viscosity, the solvent-free coating polymerization syrupy composition for use in the process of the present invention contains substantially no solvent. The terminology "solvent" used herein means a component which only functions to dissolve or disperse composition forming components and which itself does not polymerize. Therefore, for example, the monomer component such as methyl methacrylate, although it is liquid at ordinary temperatures and may dissolve or disperse other composition forming components, has polymerizability and, hence, is not regarded as the solvent in the present invention. The terminology "containing substantially no solvent" used herein with respect to the process of the present invention means that any solvent is not positively added. Thus, solvents inadvertently contained in the production of the solvent-free coating polymerization syrupy composition, such as the solvent which is used, for example, in the production of the monomer, remains in the monomer and the like and finally contained in the solvent-free coating polymerization syrupy composition, are not excluded.

The solvent-free coating polymerization syrupy composition preferably contains in an amount of 5 to 75% by weight a partial polymerizate of monomers consisting of 60 to 100% by weight of an alkyl (meth)acrylate, 0 to 40% by weight of a functional group containing monomer and 0 to 40% by weight of a vinyl monomer, together with the monomers unpolymerized.

In the process of the present invention, a support is coated with the solvent-free coating polymerization syrupy composition having the above viscosity.

The support to be coated with this solvent-free coating polymerization syrupy composition preferably has at least one side thereof release treated. Examples of suitable supports include films of polyolefins such as polyethylene and polypropylene; films of synthetic resins such as polyethylene terephthalate, polytetrafluoroethylene, polyimide and polysulfone; release treated paper; and foils of metals such as stainless steel, aluminum and copper. of these, synthetic resin films such as polyethylene terephthalate film having at least one side thereof release treated are preferred. These synthetic resin films have high heat resistance and are little distorted by the polymerization autoexotherm. Although the thickness of the release treated support is not particularly limited, it is generally in the range of 12 to 500 μm, preferably 25 to 200 μm.

Before the application onto the above support, the solvent-free coating polymerization syrupy composition is defoamed. This defoaming is generally conducted by maintaining the solvent-free coating polymerization syrupy composition in vacuum at ordinary temperatures. This defoaming leads to the absence of bubbles in the obtained sheet, so that the sheet having a highly smooth surface and having high density can be obtained.

In the process of the present invention, the support is coated with the solvent-free coating polymerization syrupy composition at a thickness of at least 0.15 mm, preferably at least 0.20 mm, and still preferably 0.25 to 5 mm. That is, the solvent-free coating polymerization syrupy composition for use in the present invention is syrupy because of the containment of partial polymerizate and has high viscosity, as different from monomer mixtures, so that, as mentioned above, the solvent-free coating polymerization syrupy composition can be applied onto the support at a large thickness.

This solvent-free coating polymerization syrupy composition can be applied onto the surface of supports having their surfaces release treated by the use of a coating device such as a doctor blade, a comma coater, a die coater, a reverse coater or a roll coater.

In one mode of the process of the present invention, one support is coated with the solvent-free coating polymerization syrupy composition in the above manner to thereby form a laminate. In another mode of the process of the present invention, at the time of or after the above application of the solvent-free coating polymerization syrupy composition, a support having its surface release treated is disposed on the surface of the solvent-free coating polymerization syrupy composition so that a laminate having its upper side and lower side overlaid with respective supports is produced.

The thus formed laminate is subjected to polymerization reaction by autoexotherm, preferably autoexotherm attributed to adiabatic polymerization (heating polymerization step). The terminology "adiabatic polymerization" used herein means carrying out the polymerization without contacting the laminate having initiated polymerization with a medium of high heat transfer coefficient whose temperature is not higher than the polymerization initiation temperature. The adiabatic polymerization is generally performed in air. This heating polymerization step is initiated by heating the thus formed laminate at 60° C. or higher, preferably 65° C. or higher, and still preferably 70° to 120° C. when the heating is conducted by air heating and 60° to 200° C. when the heating is conducted by a medium of high heat transfer coefficient such as metal rolls under conditions such that the support does not suffer from heat shrinkage or other distortion.

Figure 1:
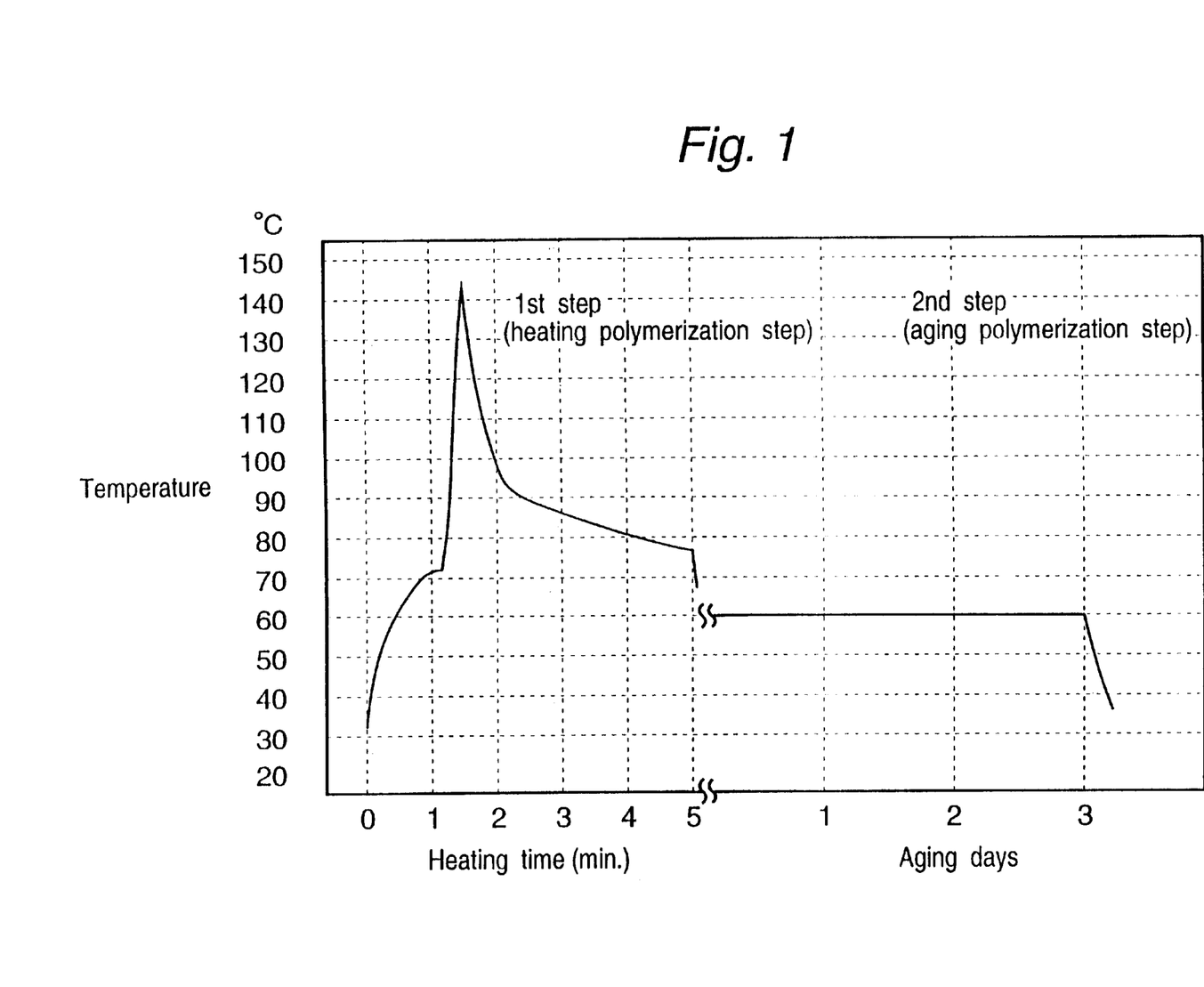
FIG. 1 is a graph showing changes of laminate surface temperature made with the passage of time, which were measured in Example 1.

In the process of the present invention, when the polymerization reaction of the solvent-free coating polymerization syrupy composition is initiated by heating the laminate at the initial stage, the calorific value is greater than the heat dissipated from the laminate surface because of the large coating thickness of the solvent-free coating polymerization syrupy composition, and the polymerization reaction is accelerated by the autoexotherm. Accordingly, the temperature of the coating layer of the solvent-free coating polymerization syrupy composition becomes higher than the heating temperature and, for example, instantaneously becomes generally 20° to 70° C. higher than the heating temperature as shown in FIG. 1. This reaction is mainly initiated by the low-temperature decomposable polymerization initiator whose 10 hr half-life temperature is in the range of 25° to 55° C. Because, as mentioned above, the reaction is advanced by the autoexotherm due to polymerization during the heating polymerization step, the reaction time of the heating polymerization step may be very short, which is generally in the range of tens of seconds to 20 min, preferably 0.5 to 10 min, when the heating is conducted by air heating and in the range of 0.1 sec to 20 min, preferably 0.5 sec to 1 min when the heating is conducted by the use of heating medium such as heating metal rolls. During the heating polymerization step, the heating is conducted at least until the low-temperature decomposable polymerization initiator begins to function, preferably from the initiation of the reaction to the consumption of most of the low-temperature decomposable polymerization initiator, that is, generally from 0.2 to 10 min and preferably from 0.5 to 5 min.

Most of the low-temperature decomposable polymerization initiator is consumed during this heating polymerization step. The acrylic vinyl monomer capable of radical polymerization contained in the solvent-free coating polymerization syrupy composition is polymerized during the heating polymerization step, so that the content of residual monomer in the coating of the solvent-free coating polymerization syrupy composition becomes 2 to 20% by weight, preferably 2 to 15% by weight, and still more preferably 2 to 10% by weight, based on the total weight of the solvent-free coating polymerization syrupy composition.

The conversion of monomers into syrupy composition is not increased over the above value by prolonging the heating during the heating polymerization step over the above period.

In the process of the present invention, the aging polymerization is performed after the above heating polymerization.

The aging polymerization step comprises maintaining the laminate having undergone the above heating polymerization step (second polymerization step) at a temperature which is at least 30° C. but lower than the heating temperature of the heating polymerization step (first polymerization step). In the process of the present invention, it is especially preferred that the aging polymerization step be performed at 35° to 75° C. In this aging polymerization step, the laminate having undergone the heating polymerization step is maintained at the above temperature for 1 hr. to 10 days. In the aging polymerization step, the high-temperature decomposable polymerization initiator having survived the heating polymerization step slowly acts so that the monomer remaining in the coating layer is polymerized over a prolonged period of time to thereby complete the polymerization in the coating layer. That is, the passing of the coating layer through the aging polymerization step enables polymerization until the content of residual monomer in the coating layer becomes 2.0% by weight or less based on the total weight of the solvent-free coating polymerization syrupy composition, preferably until substantially no monomer remains in the coating layer.

For example, the laminate having undergone the heating polymerization step is wound, and the obtained coil is held in an aging polymerization apparatus heated at preferably 35° to 75° C. In this aging polymerization step, the high-temperature decomposable polymerization initiator is slowly decomposed so that the polymerization of residual monomer proceeds under mild conditions.

The acrylic sheet obtained by the above process of the present invention is obtained by subjecting the coating layer of the syrupy composition containing substantially no solvent to the heating polymerization step and the aging polymerization step, so that the polymerization degree thereof is high and little unreacted monomer remains therein.

Moreover, the combination of the heating polymerization step and the aging polymerization step enables avoiding the heating of the support at high temperature for a prolonged period of time such that the support is distorted by heat, despite the large thickness of the coating layer, and further enables avoiding the foaming by polymerization reaction with the result that a dense layer can be formed.

The coating layer whose polymerization has been completed exhibits various properties, depending on the type of employed monomer.

For example, depending on the selection of monomer, the coating layer can be an adhesive layer which exhibits adherence upon being heated or a pressure sensitive adhesive layer which exhibits adherence at ordinary temperatures.

Furthermore, in the process of the present invention, as mentioned above, the solvent-free coating polymerization syrupy composition may be applied onto the support having its both sides release treated and, as it is, subjected to the heating polymerization under given conditions, and then, the coating layer surface may be brought into contact with the surface of support which is not overlaid with the coating layer (self-back winding) and performing the aging polymerization of the wound matter. Alternatively, the process of the present invention can comprise disposing a release treated support on the solvent-free coating polymerization syrupy composition applied on the support having its both sides release treated, performing the heating polymerization thereof under given conditions, removing the upper support, winding so that the coating layer surface from which the upper support has been removed is brought into contact with the surface of the lower support which is not overlaid with the coating layer (self-back winding) and performing the aging polymerization of the wound matter.

The adhesive sheet obtained by the process of the present invention has excellent adherence although its thickness is as large as at least 0.15 mm. Further, the period of high polymerization temperature during the polymerization steps is very short in the process of the present invention, so that the support and the coating layer after the polymerization steps are free from thermal distortion.

In the process of the present invention, a coating layer having a thickness of at least 0.15 mm can be formed by the use of the syrupy composition which does not contain solvents and is a product of partial polymerization of at least one monomer. The thus formed thick coating layer can be polymerized by passing it through the heating polymerization step in which the autoexotherm by polymerization is utilized and the subsequent aging polymerization step, thereby enabling producing a thick sheet of at least 0.15 mm thickness without the occurrence of heat distortion, etc. Moreover, the content of residual monomer in the coating layer is reduced to 0.5% by weight or less by the above polymerizations with the result that the coating layer contains little unreacted monomers.

In the conventional monomer coating process, the above thick sheet can be produced only through extremely time-consuming operations such as a plurality of laminations, and the thus obtained sheet often suffers from the heat distortion of support and the like. By contrast, in the present invention, use is made of the coating composition obtained by adding initiators having different half-lives to the syrup composed of a product of partial polymerization of at least one monomer. As a result, the coating composition, even with one application thereof, can be polymerized by the heating polymerization step and the aging polymerization step. Further, the homogeneous thick sheet whose production by the UV polymerization technique is difficult and the sheet containing a filler which inhibits ultraviolet transmission can also be produced by the process of the present invention.

Moreover, no solvent is used, so that not only can the production cost be reduced but also potential environmental pollution caused by the solvent can be avoided. Further, a highly dense layer can be formed because no solvent is used.

EXAMPLES

The present invention will now be illustrated in greater detail with reference to the following Examples, which in no way limit the scope of the invention.

Example 1

Preparation of Syrup 0.003 part by weight of photoinitiator (trade name: Irgacure 369, produced by Ciba-Geigy) was homogeneously added to 100 parts by weight of a monomer mixture consisting of 92 parts by weight of 2-ethylhexyl acrylate and 8 parts by weight of acrylic acid.

The thus obtained mixture was charged into a separable pyrex flask of 300 ml volume equipped with an agitation blade, a cooling tube, a nitrogen gas introducing tube and a thermometer. Nitrogen gas was introduced in the flask for 20 min to thereby replace the air inside the flask with nitrogen gas. The mixture was heated to 80° C. in a nitrogen stream. While maintaining this temperature, ultraviolet irradiation by water cooled high pressure mercury lamps (output: 100 W) arranged outside the flask was intermittently repeated until the ultraviolet irradiation dose became 1000 mJ/cm$^2$.

The thus obtained acrylic copolymer partial polymerizate was a syrupy composition which had a nonvolatile content of 30.0%, a viscosity of 320 poises, a weight average molecular weight, as measured by GPC, of 75 ten thousand and a number average molecular weight of 23 ten thousand.

Preparation of Pressure Sensitive Adhesive Sheet 100 parts by weight of the above syrup was loaded with 0.5 part by weight of t-butyl peroxyneodecanoate (10 hr. half-life temperature: 46.4° C., trade name: Perbutyl ND, produced by Nippon Oil & Fats Co., Ltd.) as low-temperature decomposable polymerization initiator, 0.5 part by weight of benzoyl peroxide (10 hr half-life temperature: 73.6° C., trade name: Nyper BO, produced by Nippon Oil & Fats Co., Ltd.) as high-temperature decomposable polymerization initiator, 0.05 part by weight of crosslinking agent (trade name: Light-acrylate 1, 6HX-A, produced by Kyoeisha Chemical Co., Ltd.) and 30 parts by weight of filler (PE particles having an average particle diameter of 20 μm), and mixed and deaerated at low temperature not higher than 20° C. Thus, solvent-free coating polymerization syrupy composition (A) was obtained.

This solvent-free coating polymerization syrupy composition (A) did not contain any solvent and had a viscosity of 1000 poises.

The deaerated solvent-free coating polymerization syrupy composition (A) was applied onto a 100 μm thick separator (as a support) of polyethylene terephthalate (PET) having both sides thereof release treated at a coating thickness of 0.55 mm. A release treated 100 μm thick PET separator was stuck to the upper surface of the coating of the solvent-free coating polymerization syrupy composition (A) Thus, there was obtained a laminate of sandwich closed structure comprising the coating of the solvent-free coating polymerization syrupy composition (A) interposed between the upper and lower PET separators.

This laminate was placed on a wire gauze in a hot air dryer controlled at 80° C., and changes of the temperature of the upper surface of the laminate with the passage of time were measured by means of a noncontact radiation thermometer arranged on a ceiling part of the dryer. The temperature changes are shown in FIG. 1.

Referring to FIG. 1, the surface temperature of the laminate began to rapidly rise 1 min 15 sec after being brought into the hot air dryer controlled at 80° C. and momentarily exhibited a peak temperature of 150° C. 1 min 30 sec later. It is presumable that, at that time, most of the t-butyl peroxyneodecanoate which is a polymerization initiator acting at low temperatures has been consumed.

Thereafter, the surface temperature rapidly dropped. The surface temperature dropped to 80° C. 4 min later and below 80° C. 5 min later, so that the laminate was taken out from the hot air dryer to thereby terminate the heating polymerization step (1st step).

An aliquot was sampled from the then coating, and the amount of unreacted monomer contained therein was measured by the use of gas chromatography. The content of residual monomer in the coating was calculated from the amount. The content was 7.0% by weight based on the total weight of the coating.

Subsequently, an aging polymerization (2nd step) of the coating was performed for 3 days in a dryer maintained at 60° C. The surface temperature of the coating was measured in the same manner as above. The temperature was substantially constant at 60° C. The dependence of the temperature of coating surface on the aging period is shown in FIG. 1.

With respect to the adhesive sheet obtained by the above aging polymerization, the content of residual monomer was measured in the same manner as above, which was 0.1% by weight.

The proportion of each component added and the content of residual monomer in sheet are given in Table 1.

Comparative Example 1

An acrylic pressure sensitive adhesive sheet was produced in the same manner as in Example 1, except that 0.5 part by weight of t-butyl peroxyneodecanoate was used as a polymerization initiator but benzoyl peroxide was not used.

Although the content of residual monomer in the coating having undergone the heating polymerization step was the same 7.0% by weight as in Example 1, the content of residual monomer in the adhesive sheet obtained by the aging polymerization step was 7.0% by weight, meaning that the aging polymerization step did not contribute to a substantial reduction of the content of residual monomer.

The proportion of each component added and the content of residual monomer in the sheet are given in Table 1.

Example 2

An acrylic pressure sensitive adhesive sheet was produced in the same manner as in Example 1, except that the solvent-free coating polymerization syrupy composition containing 0.5 part by weight of t-butyl peroxyneodecanoate and 0–5 part by weight of benzoyl peroxide (trade name: Nyper BO) as polymerization initiators was applied at a coating thickness of 0.35 mm.

The content of residual monomer in the coating having undergone the heating polymerization step was 6.5% by weight, and the content of residual monomer in the adhesive sheet obtained by the aging polymerization step was 0.1% by weight, meaning that the aging polymerization step contributed to a substantial reduction of the content of residual monomer.

Figure 2:
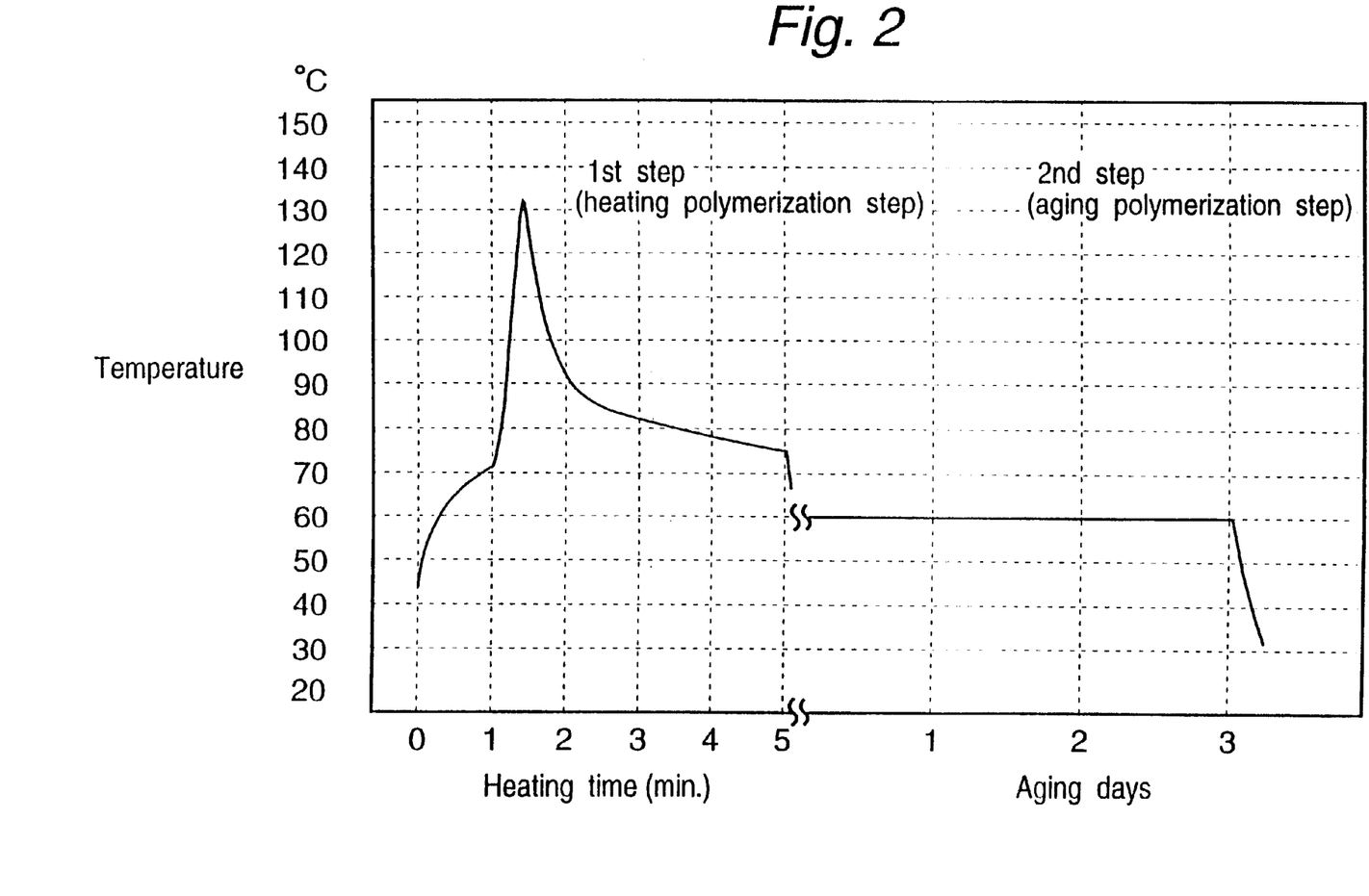
FIG. 2 is a graph showing changes of laminate surface temperature made with the passage of time, which were measured in Example 2.

The proportion of each component added and the content of residual monomer in the sheet are given in Table 1. Further, the changes of coating surface temperature are shown in FIG. 2.

Comparative Example 2

An acrylic pressure sensitive adhesive sheet was produced in the same manner as in Example 2, except that 0.5 part by weight of t-butyl peroxyneodecanoate was used as a polymerization initiator but benzoyl peroxide was not used.

Although the content of residual monomer in the coating having undergone the heating polymerization step was the same 6.5% by weight as in Example 2, the content of residual monomer in the adhesive sheet obtained by the aging polymerization step was 6.5% by weight, meaning that the aging polymerization step did not contribute to a substantial reduction of the content of residual monomer.

The proportion of each component added and the content of residual monomer in sheet are given in Table 1.

Example 3

An acrylic pressure sensitive adhesive sheet was produced in the same manner as in Example 1, except that the solvent-free coating polymerization syrupy composition containing 0.5 part by weight of t-butyl peroxyneodecanoate and 0.5 part by weight of benzoyl peroxide (trade name: Nyper BO) as polymerization initiators was applied at a coating thickness of 0.20 mm.

The content of residual monomer in the coating having undergone the heating polymerization step was 5.5% by weight, and the content of residual monomer in the adhesive sheet obtained by the aging polymerization step was 0.1% by weight, meaning that the aging polymerization step contributed to a substantial reduction of the content of residual monomer.

Figure 3:
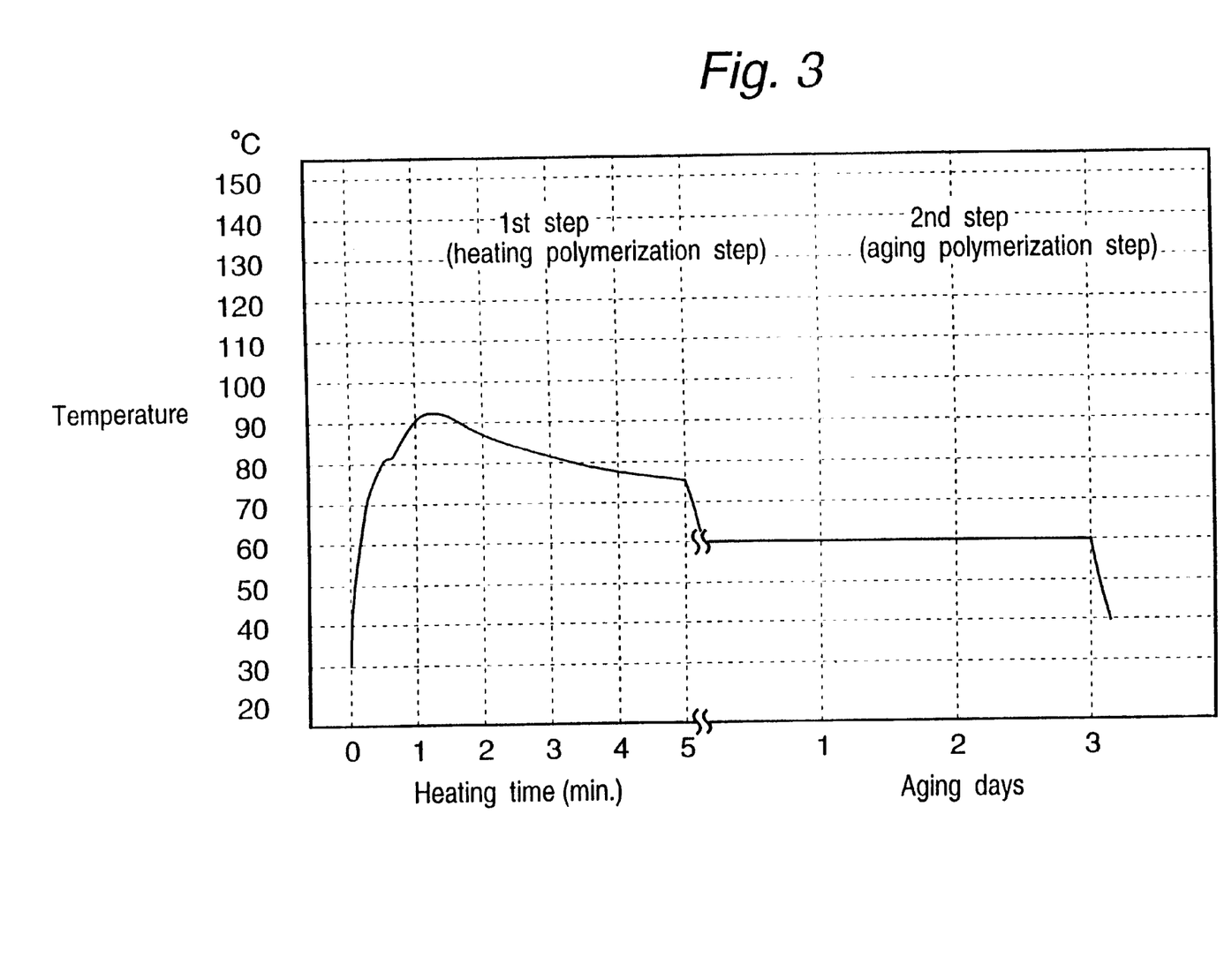
FIG. 3 is a graph showing changes of laminate surface temperature made with the passage of time, which were measured in Example 3.

The proportion of each component added and the content of residual monomer in the sheet are given in Table 1. Further, the changes of coating surface temperature are shown in FIG. 3.

Comparative Example 3

An acrylic pressure sensitive adhesive sheet was produced in the same manner as in Example 3, except that 0.5 part by weight of t-butyl peroxyneodecanoate was used as a polymerization initiator but benzoyl peroxide was not used.

Although the content of residual monomer in the coating having undergone the heating polymerization step was the same 5.5% by weight as in Example 3, the content of residual monomer in the adhesive sheet obtained by the aging polymerization step was 3.5% by weight, meaning that the reduction of the content of residual monomer attained by the aging polymerization step was smaller than in Example 3.

The proportion of each component added and the content of residual monomer in the sheet are given in Table 1.

Example 4

An acrylic pressure sensitive adhesive sheet was produced in the same manner as in Example 1, except that the solvent-free coating polymerization syrupy composition containing 0.5 part by weight of t-butyl peroxyneodecanoate and 0.5 part by weight of benzoyl peroxide (trade name: Nyper BO) as polymerization initiators was applied at a coating thickness of 0.15 mm.

The content of residual monomer in the coating having undergone the heating polymerization step was 5.0% by weight, and the content of residual monomer in the adhesive sheet obtained by the aging polymerization step was 0.1% by weight, meaning that the aging polymerization step contributed to a substantial reduction of the content of residual monomer.

Figure 4:
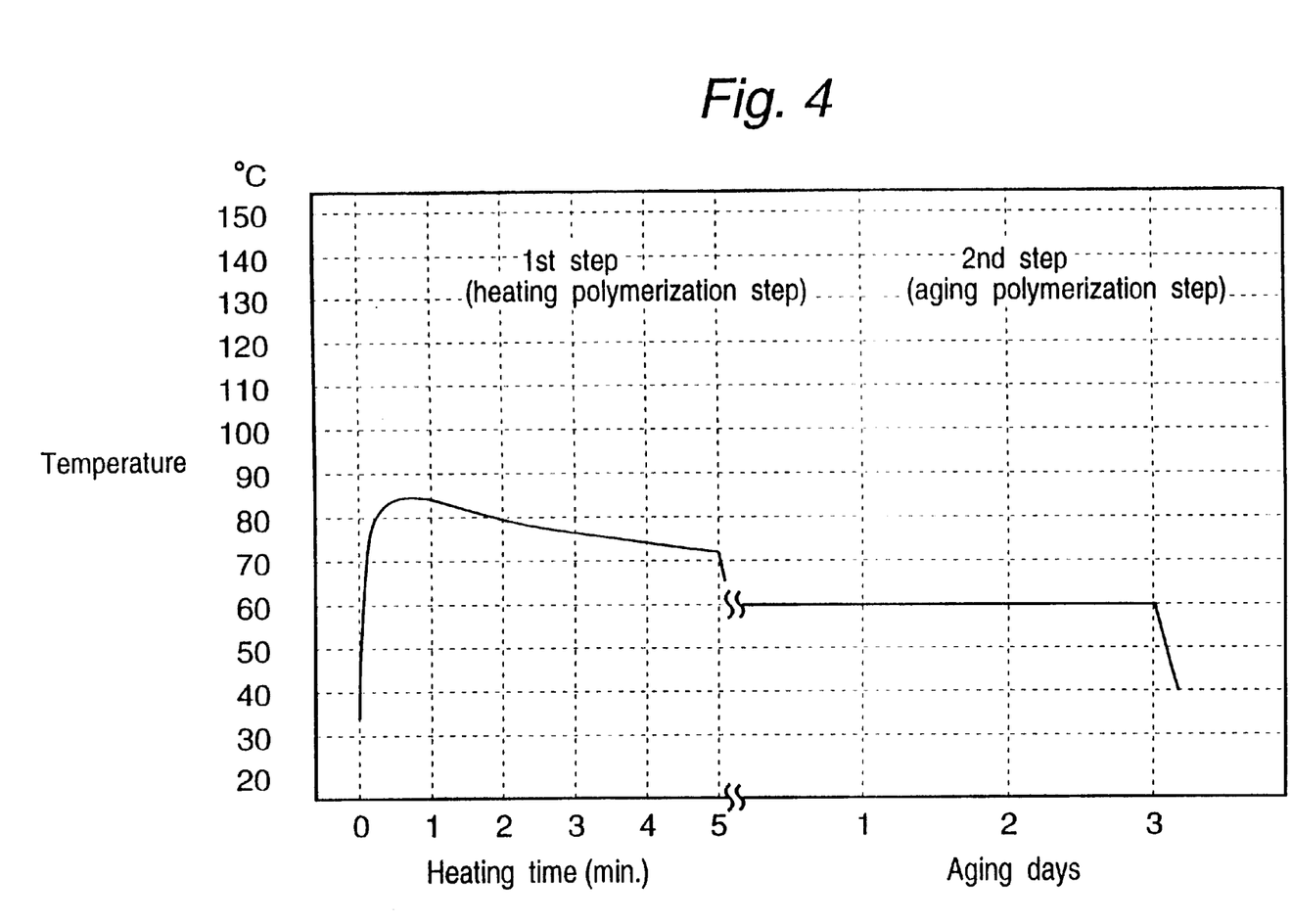
FIG. 4 is a graph showing changes of laminate surface temperature made with the passage of time, which were measured in Example 4.

The proportion of each component added and the content of residual monomer in the sheet are given in Table 1. Further, the changes of coating surface temperature are shown in FIG. 4.

Comparative Example 4

An acrylic pressure sensitive adhesive sheet was produced in the same manner as in Example 4, except that 0.5 part by weight of t-butyl peroxyneodecanoate was used as a polymerization initiator but benzoyl peroxide was not used.

Although the content of residual monomer in the coating having undergone the heating polymerization step was the same 5.0% by weight as in Example 4, the content of residual monomer in the adhesive sheet obtained by the aging polymerization step was 2.0% by weight, meaning that the reduction of the content of residual monomer attained by the aging polymerization step was smaller than in Example 4.

The proportion of each component added and the content of residual monomer in the sheet are given in Table

TABLE 1

| | Formulation of syrup compsn. (A) | | | Coating | | |
|---|---|---|---|---|---|---|
| | | t-butyl peroxy-neodec- | benzoyl | | cont. of residual monomer in sheet | |
| | syrup (pts. wt.) | anoate (pts. wt.) | peroxide (pts. wt.) | thick-ness (mm) | 1st step (wt. %) | 2nd step (wt. %) |
| Example 1 | 100 | 0.5 | 0.5 | 0.55 | 7.0 | 0.1 |
| Comp. Ex. 1 | 100 | 0.5 | — | 0.55 | 7.0 | 7.0 |
| Example 2 | 100 | 0.5 | 0.5 | 0.35 | 6.5 | 0.1 |
| Comp. Ex. 2 | 100 | 0.5 | — | 0.35 | 6.5 | 6.5 |
| Example 3 | 100 | 0.5 | 0.5 | 0.20 | 5.5 | 0.1 |
| Comp. Ex. 3 | 100 | 0.5 | — | 0.20 | 5.5 | 3.5 |
| Example 4 | 100 | 0.5 | 0.5 | 0.15 | 5.0 | 0.1 |
| Comp. Ex. 4 | 100 | 0.5 | — | 0.15 | 5.0 | 2.0 |

$1^{st}$ step: heating polymerization step
$2^{nd}$ step: aging polymerization step As apparent from Table 1 and FIGS. 1 to 4, when thick acrylic sheets are produced by the process of the present invention, the greater the thickness of the coating layer, the greater the autoexotherm. For example, referring to FIG. 1, the surface temperature momentarily rises to 140° C. or higher at the coating thickness of 0.55 mm. However, the greater the thickness of the coating layer, the lower the conversion of monomers into syrupy composition during the first step (heating polymerization step).

With respect to the above thick acrylic sheet wherein the autoexotherm is large, performing only the first step causes the conversion of monomers into syrupy composition of the coating layer to be low even if the polymerization temperature becomes high, so that a considerable amount of monomer remains unreacted.

In the process of the present invention, the partial polymerizate syrup is loaded with two types of polymerization initiators having different 10 hr half-life temperatures, and the residual monomer is polymerized under mild conditions in the low-temperature second step (aging polymerization step) subsequent to the above first step with the result that the final content of residual monomer in the coating layer is reduced to 0.5% by weight or less, particularly 0.1% by weight in the above Examples.

Example 5

100 parts by weight of the syrup produced by the procedure described in the section "Preparation of syrup" in Example 1 was loaded with 0.5 part by weight of t-butyl peroxyneodecanoate (10 hr half-life temperature: 46.5° C., produced by Nippon Oil & Fats Co., Ltd.) as the first thermally decomposable initiator (low-temperature decomposable polymerization initiator), 0.5 part by weight of benzoyl peroxide (10 hr half-life temperature: 73.6° C., produced by Nippon Oil & Fats Co., Ltd.) as the second thermally decomposable initiator (high-temperature decomposable polymerization initiator), 0.05 part by weight of crosslinking agent (trade name: Tetrad-X, produced by Mitsubishi Gas Chemical Co., Inc.) and 40 parts by weight of filler (PE particles having an average particle diameter of 20 μm), and mixed and deaerated at low temperature not higher than 20° C. Thus, solvent-free coating polymerization syrupy composition (B) was obtained.

This solvent-free coating polymerization syrupy composition (B) did not contain any solvent and had a viscosity of 1230 poises.

The deaerated solvent-free coating polymerization syrupy composition (B) was applied onto a 100 μm thick separator of polyethylene terephthalate (PET) having both sides thereof release treated at a coating thickness of 0.40 mm. A release treated 100 μm thick PET separator was stuck to the upper surface of the coating of the solvent-free coating polymerization syrupy composition (B). Thus, there was obtained a laminate of sandwich closed structure comprising the coating of the solvent-free coating polymerization syrupy composition (B) interposed between the upper and lower PET separators.

This laminate was placed on a wire gauze in a hot air dryer controlled at 80° C. which had a noncontact radiation thermometer arranged on a ceiling part thereof and heated for 5 min in the same manner as in Example 1.

Subsequently, an aging polymerization of the coating was performed for 3 days in a dryer maintained at 60° C. The thus obtained acrylic adhesive sheet was cooled to room temperature, and its performance was evaluated.

The performance evaluation results of the obtained acrylic adhesive sheet are given in Table 2.

Example 6

The solvent-free coating polymerization syrupy composition (B) produced in Example 5 was applied and polymerized by the use of a 25 mm width coating machine to thereby obtain a wound pressure sensitive adhesive sheet.

In detail, a 38 μm thick PET separator having both sides thereof release treated was passed at a line speed of 1.0 m/min through a 25 mm width coating machine equipped with an unwind unit, an adhesive dam, a comma coater, a hot air drying oven capable of temperature control, a metal roller, a wind-up unit, a laminator, etc. so that the PET separator was flow-coated with the solvent-free coating polymerization syrupy composition (B) fed from the adhesive dam by means of a knife coater to thereby form a 0.4 mm coating layer on the PET separator.

Subsequently, a 38 μm thick PET separator having its one side release treated, fed from the unwind unit, had the release treated side thereof brought into contact with the coating layer of the solvent-free coating polymerization syrupy composition (B). The resultant laminate was heated by 80° C. hot air to thereby polymerize the solvent-free coating polymerization syrupy composition (B). The laminate was passed through the drying oven in 3 min, had its upper PET separator removed and wound so that the surface of the lower separator not furnished with the coating layer was brought into contact with the coating layer.

The thus obtained wound sheet was subjected to aging polymerization conducted in a 60° C. drying oven for 3 days.

The wound acrylic pressure sensitive adhesive sheet was cooled to room temperature, and the performance thereof was evaluated. The results are given in Table 2.

Example 7

An acrylic pressure sensitive adhesive sheet was produced in the same manner as in Example 6, except that a 100 μm thick PET separator having both sides thereof release treated was used in place of the 38 μm thick one and the solvent-free coating polymerization syrupy composition (B) was applied at a coating thickness of 1.2 mm in place of 0.4 mm.

The performance evaluation results of the obtained acrylic pressure sensitive adhesive sheet are given in Table 2.

Example 8

Preparation of Syrup 400 parts by weight of a monomer mixture consisting of 300 parts by weight of butyl acrylate and 100 parts by weight of acrylic acid was charged into a separable pyrex flask of 1 lit. volume equipped with an agitation blade, a cooling tube, a nitrogen gas introducing tube, a thermometer and an initiator charging port. Nitrogen gas was introduced in the flask for 20 min to thereby replace the air inside the flask with nitrogen gas. The mixture was heated to 65° C. in a nitrogen stream. In the nitrogen stream, under agitation, 0.03 part by weight of thermally decomposable initiator (trade name: V-60(AIBN), produced by Wako Pure Chemical Industries, Ltd.) was charged through the initiator charging port, and polymerization was performed at 65° C. for 20 min.

Polymerization was completed within a few minutes. The thus obtained acrylic copolymer partial polymerizate was a syrupy composition which had a nonvolatile content of 10.5%, a viscosity of 250 poises, a weight average molecular weight, as measured by GPC, of 120 ten thousand and a number average molecular weight of 32.5 ten thousand.

Preparation of Sheet 2 parts by weight of ethylene glycol diacrylate (trade name: Light-ester EG-A, produced by Kyoeisha Chemical Co., Ltd.) was added to 98 parts by weight of the above syrup. 100 parts by weight of the thus obtained syrupy composition was loaded with 0.5 part by weight of 1-hexyl peroxyneodecanoate (10 hr half-life temperature: 44.5° C., trade name: Perhexyl ND, produced by Nippon Oil & Fats Co., Ltd.) as the low-temperature decomposable polymerization initiator and 0.5 part by weight of t-butyl peroxyisobutyrate (10 hr half-life temperature: 77.3° C., trade name: Perbutyl IB, produced by Nippon Oil & Fats Co., Ltd.) as the high-temperature decomposable polymerization initiator, and mixed and deaerated at low temperature not higher than 20° C. Thus, solvent-free coating polymerization syrupy composition (C) was obtained.

This solvent-free coating polymerization syrupy composition (C) did not contain any solvent and had a viscosity of 520 poises.

The deaerated solvent-free coating polymerization syrupy composition (C) was applied onto a 100 μm thick separator (as a support) of polyethylene terephthalate (PET) having both sides thereof release treated at a coating thickness of 0.50 mm. A release treated 100 μm thick PET separator was stuck to the upper surface of the coating of the solvent-free coating polymerization syrupy composition (C). Thus, there was obtained a laminate of sandwich closed structure comprising the coating of the solvent-free coating polymerization syrupy composition (C) interposed between the upper and lower PET separators.

An acrylic sheet was produced in the same manner as in Example 1, except that use was made of the thus prepared laminate.

The obtained acrylic sheet was a colorless transparent elastic sheet having no adherence.

TABLE 2

|  | Sheet thickness | Holding power 80° C. × 10000 min | Adhesive strength 90° peeling method N/10 mm |
| --- | --- | --- | --- |
| Example 5 | 0.4 mm | shear 0 | 20 |
| Example 6 | 0.4 mm | shear 0 | 20 |
| Example 7 | 1.2 mm | shear 0 | 30 |

Evaluation was made in accordance with Japanese Industrial Standard Z 0237 (method of testing pressure sensitive adhesive tape/pressure sensitive adhesive sheet).

Comparative Example 5

An acrylic pressure sensitive adhesive sheet was produced in the same manner as in Example 1, except that 1.0 part by weight of azobisisobutyronitrile (AIBN, 10 hr half-life temperature: 65° C.) was used as the thermally decomposable initiator. Foaming and thickness irregularity were observed throughout the surface of the obtained sheet.

Comparative Example 6

Sheet sandwiched between PET separators was produced in the same manner as in Example 1, except that 1.0 part by weight of benzoyl peroxide (BPO, 10 hr half-life temperature: 73.6° C.) was used as the thermally decomposable initiator, mixing and deaeration were performed at room temperature and coating polymerization was carried out at a heating temperature set at 90° C. However, the entirety of the sheet which had a structure comprising the solvent-free coating polymerization syrupy composition interposed the PET separator was distorted, and thickness and shrinkage irregularities were observed.

Comparative Example 7

The same procedure as in Example 1 was repeated except that the aging polymerization was performed by heating at 100° C. higher than the heating temperature of the first step, in place of 60° C., for 3 days. In this instance, the content of residual monomer was 3.2% by weight and the polymerization was not completed.

Example 9

Preparation of Syrup

0–003 part by weight of photoinitiator (trade name: Irgacure 369, produced by Ciba-Geigy) was homogeneously added to 100 parts by weight of a monomer mixture consisting of 92 parts by weight of acrylic acid/2-ethylhexyl acrylate and 8 parts by weight of acrylic acid.

The mixture was heated to 137° C. in a nitrogen stream, and ultraviolet irradiation by high pressure mercury lamps (output: 100 W) was intermittently repeated until the ultraviolet irradiation dose became 3600 mJ/cm$^2$.

The thus obtained acrylic copolymer partial polymerizate was a syrupy composition which had a nonvolatile content of 55%, a viscosity of 350 poises, a weight average molecular weight, as measured by GPC, of 30 ten thousand and a number average molecular weight of 5.6 ten thousand.

Preparation of Pressure Sensitive Adhesive Sheet 10 100 parts by weight of the above syrup was loaded with 0.3 part by weight of hexyl peroxyneodecanoate (10 hr half-life temperature: 44.5° C., trade name: Perhexyl ND, produced by Nippon Oil & Fats Co., Ltd.) as the low-temperature decomposable polymerization initiator, 0.3 part by weight of t-butyl peroxy-2-ethylhexanoate (10 hr half-life temperature: 72.1° C., trade name: Perbutyl O, produced by Nippon Oil & Fats Co., Ltd.) as the high-temperature decomposable polymerization initiator, 0.1 part by weight of crosslinking agent (trade name: Tetrad-X, produced by Mitsubishi Gas Chemical Co., Inc.) and 10 parts by weight of filler (PE particles having an average particle diameter of 20 μm), and mixed and deaerated at low temperature not higher than 20° C. Thus, solvent-free coating polymerization syrupy composition (D) was obtained.

This solvent-free coating polymerization syrupy composition (D) was continuously applied onto a 38 μm thick and 250 mm wide separator of polyethylene terephthalate (PET) having both sides thereof release treated at a coating thickness of 1.0 mm by means of a comma coater.

This laminate was passed at a line speed of 1 m/min through a hot air drying oven with a heating oven length of 3 m, wherein the hot air temperature and airflow rate were set at 105° C. and 1 m/sec, respectively, and wound so that the back of the PET separator was brought into contact with the coating layer. Thereafter, the wound sheet was subjected to aging polymerization conducted for 2 days in a drying oven maintained at 70° C.

The wound acrylic adhesive sheet was cooled to room temperature, and the properties and adherence performance thereof were evaluated. The results are given in Table 3.

TABLE 3

| | Coating | | | Performance of pressure sensitive adhesive sheet** | |
|---|---|---|---|---|---|
| | | Cont. of residual monomer in sheet* | | | Adhesive strength |
| | Thickness (mm) | 1st step (wt %) | 2nd step (wt %) | Holding power 80° C. × 10000 min | 90° peeling method N/10 mm |
| Example 9 | 1.0 | 3.5 | 0.1 | upper surface (open surface) not fell   lower surface (closed surface) not fell | upper surface (open surface) 20   lower surface (closed surface) 20 |

*measured by gas chromatography.
**according to JIS Z 0237 (method of testing pressure sensitive adhesive tape/pressure sensitive adhesive sheet):
holding power: to SUS, 1 kg/25 × 25 mm, and
adhesive strength: to SUS, pulling speed 300 mm/min.

What is claimed is:

1. A process for producing a solvent-free acrylic sheet, comprising:
   a coating step comprising either coating at least one support with a solvent-free syrupy composition for coating polymerization or applying the solvent-free coating polymerization syrupy composition between at least two supports at a coating thickness of at least 0.15 mm to thereby form a laminate, said solvent-free coating polymerization syrupy composition comprising an acrylic vinyl monomer capable of radical polymerization, at least one member selected from the group consisting of an acrylic vinyl monomer partial polymerizate and a polymer including a unit derived from an acrylic vinyl monomer, a low-temperature decomposable polymerization initiator having a 10 hr half-life temperature ranging from 25° to 55° C. and a high-temperature decomposable polymerization initiator having a 10 hr half-life temperature ranging from above 55° to 90° C., said solvent-free coating polymerization syrupy composition having a viscosity ranging from 20 to 2000 poises at 25° C., said solvent-free coating polymerization syrupy composition containing substantially no solvent;

a heating polymerization step comprising heating the laminate at 60° C. or higher for reaction initiation so that autoexotherm is induced to thereby cause the acrylic vinyl monomer capable of radical polymerization contained in the solvent-free coating polymerization syrupy composition to polymerize until the content of residual monomer in the solvent-free coating polymerization syrupy composition is in the range of 2 to 20% by weight based on the total weight of the solvent-free coating polymerization syrupy composition; and an aging polymerization step comprising maintaining the laminate having undergone the heating polymerization step at a temperature that is at least 30° C. but lower than the heating temperature of the heating polymerization step so that a polymerization reaction is effected until the content of residual monomer in the laminate is 2% by weight or less based on the solvent-free coating polymerization syrupy composition.

2. The process as claimed in claim 1, wherein the reaction initiation temperature of the heating polymerization step is in the range of 65° to 85° C., and, during the aging polymerization step after the heating polymerization step, the polymerization reaction is performed at a temperature ranging from 35° to below 75° C.

3. The process as claimed in claim 1, wherein, the low-temperature decomposable polymerization initiator and the high-temperature decomposable polymerization initiator are contained so that, during the heating polymerization step, the autoexotherm is attributed to adiabatic polymerization and the temperature of the laminate is increased thereby to 20° to 70° C. higher than the heating temperature.

4. The process as claimed in claim 1, wherein the aging polymerization is performed by maintaining the laminate at 30° to 75° C. for 1 to 240 hr.

5. The process as claimed in claim 1, wherein the solvent-free coating polymerization syrupy composition further comprises a filler having substantially no reactivity with the acrylic vinyl monomer capable of radical polymerization, said filler having an average particle diameter of 1 to 200 μm.

6. The process as claimed in claim 1, wherein the low-temperature decomposable polymerization initiator and the high-temperature decomposable polymerization initiator are added in a weight ratio of 1:10 to 10:1 to the solvent-free coating polymerization syrupy composition.

7. The process as claimed in claim 1, wherein the low-temperature decomposable polymerization initiator and the high-temperature decomposable polymerization initiator are added in a total amount of 0.1 to 5 parts by weight per 100 parts by weight of the sum of the acrylic vinyl monomer capable of radical polymerization and the partial polymerizate of the acrylic vinyl monomer in the solvent-free coating polymerization syrupy composition thereof.

8. The process as claimed in claim 1, wherein the laminate comprises two supports of upper and lower, and the solvent-free coating polymerization syrupy composition is interposed between the upper support, which is release treated on at least the lower side thereby and the lower support, which is release treated on both sides thereby, and the composition is subjected to the heating polymerization step; the upper support is removed from the solvent-free coating polymerization syrupy composition of the laminate; winding is performed so that the surface of the solvent-free coating polymerization syrupy composition from which the upper support has been removed is brought into contact with the side of the lower support which is not overlaid with the solvent-free coating polymerization syrupy composition; and the wound matter is subjected to the aging polymerization step.

9. The process as claimed in claim 1, wherein the solvent-free coating polymerization syrupy composition contains in an amount of 5 to 75% by weight a partial polymerizate of monomers consisting of 60 to 100% by weight of an alkyl (meth)acrylate, 0 to 40% by weight of a functional group containing monomer and 0 to 40% by weight of a vinyl monomer, together with the monomers unpolymerized.

10. The process as claimed in claim 1, wherein the solvent-free acrylic sheet is an acrylic adhesive sheet.

* * * * *

UNITED STATES PATENT AND TRADEMARK OFFICE
CERTIFICATE OF CORRECTION

PATENT NO. : 6,165,549
DATED : December 26, 2000
INVENTOR(S) : Youichi Takizawa et al.

It is certified that error appears in the above-identified patent and that said Letters Patent is hereby corrected as shown below:

Column 1, Lines 35-36, after "employing" delete --thus--.

Column 1, Line 58, "in addition" should read --and, in addition,--.

Column 6, Line 14, "( ($\alpha$, $\dot{\alpha}$-" should read --($\alpha$, $\dot{\alpha}$- --.

Column 8, Line 31, "of" should read --Of--.

Column 12, Line 36, after "(A)" insert --.-- (period).

Column 15, Line 2, after "Table" insert --1.--

Column 18, Line 65, "10 100" should read --100--.

Column 19, Line 2 "15 0.3" should read --0.3--.

Column 19, Line 43, "(closed)" should read --(closed--.

Signed and Sealed this

Eighth Day of May, 2001

Attest:

NICHOLAS P. GODICI

Attesting Officer

Acting Director of the United States Patent and Trademark Office